United States Patent
Rasenack

(10) Patent No.: US 9,499,350 B2
(45) Date of Patent: Nov. 22, 2016

(54) METHOD FOR OPERATING A CONVEYOR INSTALLATION

(71) Applicant: SIEMENS AKTIENGESELLSCHAFT, Munich (DE)

(72) Inventor: Wolf-Martin Rasenack, Marloffstein (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 43 days.

(21) Appl. No.: 14/377,077

(22) PCT Filed: Nov. 23, 2012

(86) PCT No.: PCT/EP2012/073433
§ 371 (c)(1),
(2) Date: Aug. 6, 2014

(87) PCT Pub. No.: WO2013/117260
PCT Pub. Date: Aug. 15, 2013

(65) Prior Publication Data
US 2015/0008098 A1    Jan. 8, 2015

(30) Foreign Application Priority Data

Feb. 6, 2012 (EP) .................................... 12153974

(51) Int. Cl.
*B65G 43/00* (2006.01)
*B65G 23/04* (2006.01)
*B65G 15/30* (2006.01)

(52) U.S. Cl.
CPC ............... *B65G 43/00* (2013.01); *B65G 15/30* (2013.01); *B65G 23/04* (2013.01)

(58) Field of Classification Search
CPC ...... B65G 23/04; B65G 23/00; B65G 43/00; B65G 2811/095; B65G 2811/096; B65G 15/30
USPC .............................. 198/832, 835, 832.1, 571
See application file for complete search history.

(56) References Cited

U.S. PATENT DOCUMENTS 3,923,151 A    12/1975  Weber
5,330,423 A *   7/1994  Holster .................. G05D 17/02
                                                    474/28

(Continued)

FOREIGN PATENT DOCUMENTS

DE    2 252 709      5/1974
EP    0414939        3/1991

(Continued)

OTHER PUBLICATIONS

European Office Action for European Patent Application No. 12 153 974.6, issued on Apr. 29, 2015, 4 pages.
Extended European Search Report mailed Jul. 9, 2012 for corresponding European Patent Application No. 12153974.6.
International Search Report mailed Jan. 16, 2013 for corresponding International Patent Application No. PCT/EP2012/073433.

*Primary Examiner* — Leslie A Nicholson, III
*Assistant Examiner* — Keith R Campbell
(74) *Attorney, Agent, or Firm* — Henry M. Feiereisen LLC.

(57) ABSTRACT

A method operates a conveyor installation having a belt and at least one drive drum for driving the belt. The torque acting on the drive drum is controlled, in order to alter the speed of the belt, within a time window that is defined by a first rotational speed of the drive drum and a second rotational speed of the drive drum.

14 Claims, 3 Drawing Sheets

(56) References Cited

U.S. PATENT DOCUMENTS 6,761,263 B2 7/2004 Becker et al.
7,343,119 B2 * 3/2008 Matsuda ............ G03G 15/0131
399/167
2003/0075417 A1 4/2003 Becker et al.

FOREIGN PATENT DOCUMENTS

EP 12153974.6 2/2012
WO WO 01/53174 A1 7/2001
WO PCT/EP2012/073433 11/2012

* cited by examiner

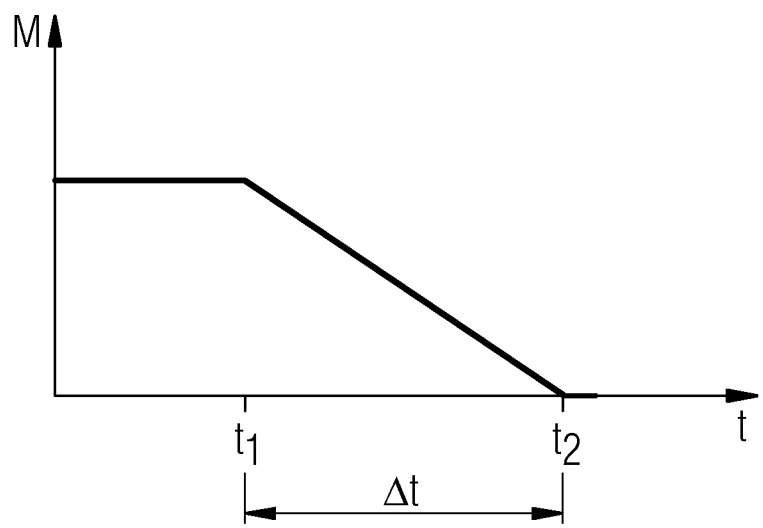
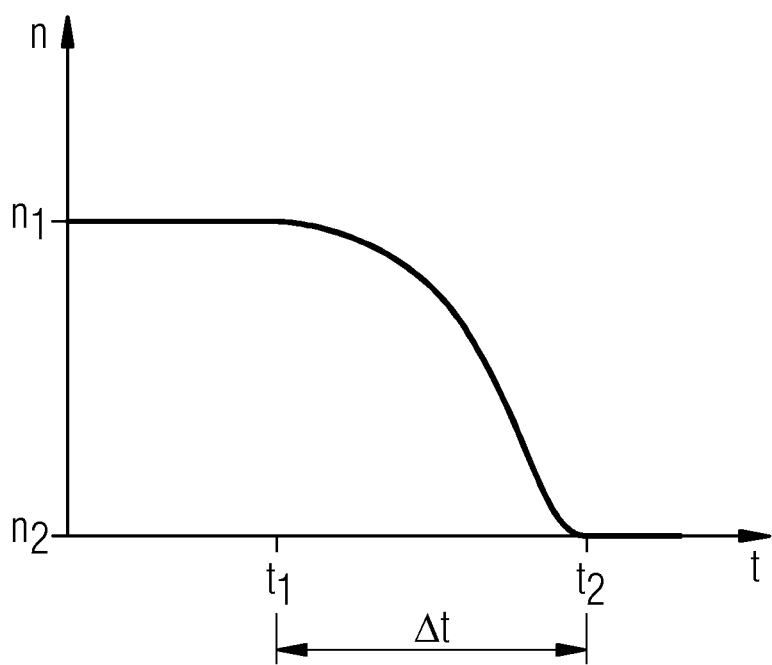

METHOD FOR OPERATING A CONVEYOR INSTALLATION

CROSS REFERENCE TO RELATED APPLICATIONS

This application is based on and hereby claims priority to International Application No. PCT/EP2012/073433 filed on Nov. 23, 2012 and European Application No. 12153974 filed on Feb. 6, 2012, the contents of which are hereby incorporated by reference.

BACKGROUND

The invention relates to a method for operating a conveyor installation comprising a belt and at least one drive drum for driving said belt.

Conveyor installations, by way of example trough conveyors or tubular belt conveyors, include a belt, which is used to convey material to be conveyed, and at least one drive drum, with the aid of which the belt can be driven. Conveyor installations also include deflection drums and a drive system for driving the drive drum. This drive system in turn includes a gear and a motor. One or more frequency converter(s) is/are used for driving and controlling the motor or motors in particular in the case of relatively long conveyor belts.

If the speed of the belt is to be altered, by way of example when starting up or stopping the conveyor installation, then the aim is to bring the belt from one speed level to another speed level, i.e. to decelerate or accelerate the drive drum from a first rotational speed to a second rotational speed, so as to be as free from tension as possible. It is desirable in particular when stopping the conveyor installation to tension the belt as little as possible. Operation of the conveyor installation in this way spares the belt and then also simplifies restarting.

To alter the speed of the belt, rotational speeds and the timings thereof with which the motor and the drive drum driven thereby should rotate, are specified by the frequency converter. The course of a corresponding rotational speed characteristic curve is smoothed and adjusted by a ramp function generator such that only low torsional or force impacts act on the material, i.e. in particular the drive drum and belt. The run-up and run-back times and ramp rounding times of the rotational speed characteristic curve for jerk limitation can be given for this purpose. Ramp rounding of the rotational speed characteristic curve is taken to mean that the rotational speeds of the drive drum alter steadily rather than suddenly. During an acceleration process by way of example therefore the rotational speed characteristic curve does not have a true ramp shape and is instead rounded at the start and at the end, so it has an S curve. Despite such a design of the rotational speed characteristic curve the belt is undesirably tensioned in the event of an alteration in speed. The torque increases massively just before the belt comes to a standstill and up to the time when the converter is switched off, in particular when the conveyor installation is stopped. The torque is suddenly set at zero at the switch-off time. The preceding increase in torque only tensions the belt, however, and does not have any positive effect on the stopping process. After the converter has been switched off the belt springs back as a result of its tensioning and the speed gains appreciable momentum in the negative direction. The belt relaxes slightly as a result of this springing-back. The run-back and ramp rounding times have previously been adjusted to avoid tensioning of this kind and the subsequent springing-back of the belt. However, this also leads to only a slight improvement.

A method for controlling the start-up of a conveyor installation comprising a belt and at least one drive drum for driving the belt is known from WO 01/53174 A1, in which the desired value of the speed of the belt is increased in a first period with increasing acceleration and in a second period with decreasing acceleration. The effects mentioned above also occur as a result of such an alteration in the speed, however.

SUMMARY

It is therefore one potential object to propose a method with which tensioning of a belt is largely avoided during an alternation in the speed thereof.

The inventor proposes a method for operating a conveyor installation. According to the proposal, when operating a conveyor installation comprising a belt and at least one drive drum for driving said belt, the torque acting on the drive drum is controlled, in order to alter the speed of the belt, within a time window that is defined by a first rotation speed of the drive drum and a second rotational speed of the drive drum.

Therefore, it is no longer the rotational speed of the drive drum which is specified, as is known from the related art, but the torque acting on the drive drum. This has the advantage that the force acting on the belt by way of the drive roller is also specified by the explicitly specified torque and this force can therefore be changed so gently that the belt can be brought from one speed level to another speed level particularly gently, thereby avoiding tensioning of the belt. The choice of time window defined by the first rotational speed and second rotational speed is used in particular for this purpose. This time window is chosen such that its length does not cause an excessively abrupt change in the torque, so the change in torque therefore enables gentle acceleration or deceleration of the drive drums and therefore of the belt.

Compared to specification of the rotational speed, unpredictable factors, such as temperature dependence, loading state or age of the belt, do not play such a significant part either in the proposed specifying of the torque in the case of torque control. The torque is therefore forced by the torque specification to accept the specified value, i.e. in the case of stoppage of the belt by way of example to become continuously smaller. In a case of this kind the torque cannot increase any more as a result of other influences either. When the belt is at a standstill the torque is equal to zero, ruling out springing-back of the belt. The belt is therefore moved as gently as possible hereby.

In a preferred embodiment the first rotational speed is lower than the second rotational speed and the torque is controlled within the time window such that it is monotonically increasing. The speed of the drive drum or belt is therefore increased in that an explicitly monotonically increasing torque ramp is passed through.

Conversely, the speed of the belt can be gently reduced in that the first rotational speed is greater than the second rotational speed and the torque is controlled within the time window such that it is monotonically decreasing.

If the second rotational speed is equal to zero then a belt can be stopped without tensioning occurring since an increase in the torque before the belt comes to a standstill is prevented by the impressing of a continuously decreasing torque. Tensioning and springing-back of the belt once the zero torque has been reached is therefore prevented.

After the belt has been stopped, i.e. once the belt has come to a standstill, it is preferably fixed by a fixing brake so it is not accelerated again due to its own weight or loaded material.

Particularly gentle acceleration or braking of the belt is achieved if the torque runs steadily within the time window. If the belt is stopped by way of example, a negatively increasing torque ramp can therefore be passed through, so the stopping time defined by the time window is at least as long as the coasting time of the conveyor installation, i.e. the time that the belt requires from its operating state to a standstill if it is decelerated owing to its friction. The time window is preferably twice, in particular three times, as long as the coasting time, which typically has a duration of about 3 s to 20 s.

If the torque has a linear course then this method can be implemented especially easily, in particular more easily than the specification of a rotational speed, known from the related art, with a specific characteristic curve.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 4 shows the proposed characteristic of the torque during a stopping phase;

FIG. 5 shows the rotational speed characteristic corresponding to FIG. 4.

DETAILED DESCRIPTION OF THE PREFERRED EMBODIMENT

Figure 1:
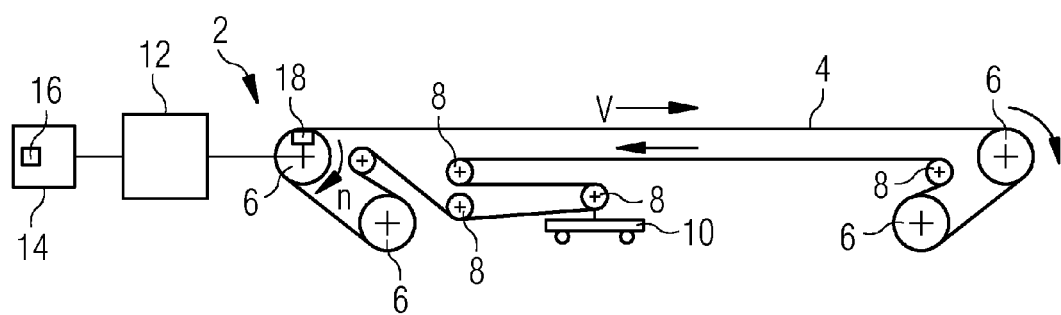
FIG. 1 shows a conveyor installation.

Reference will now be made in detail to the preferred embodiments of the present invention, examples of which are illustrated in the accompanying drawings, wherein like reference numerals refer to like elements throughout.

FIG. 1 shows a conveyor installation 2 comprising a belt 4 and a total of four drive drums 6 for driving the belt 4. So the belt 4 rests on the drive drums 6 to the appropriate extent, the conveyor installation 2 comprises a plurality of deflection rollers 8. To achieve adequate tensioning of the belt even at different temperatures and with different loading of the belt 4, a tensioning carriage 10 is arranged along the belt 4, and this can be moved in such a way that adequate tensioning of the belt 4 is achieved. A motor 12, which is connected with a converter 14 to a controller 16, is indicated by way of example in FIG. 2 on a drive drum 6. The motor 12 causes the drive drum 6 to rotate, so it exerts a force on the belt 4. In the operating state the belt 4 therefore rotates in the direction of the indicated arrows at a predefined speed v. This speed v is adjusted using the rotational speed n of the drive drums 6.

If the speed v of the belt 4 is to be altered then previously the motor 12 has been influenced with the aid of the converter 14 such that the rotational speed n of the drive drums 6 is altered. A characteristic of the rotational speed n of the drive drums 6 is therefore specified by the controller 16. Reference will be made below to just one drive drum 6 respectively. Where a plurality of drive drums 6 exists the respective statements apply to these accordingly, however.

Figure 2:
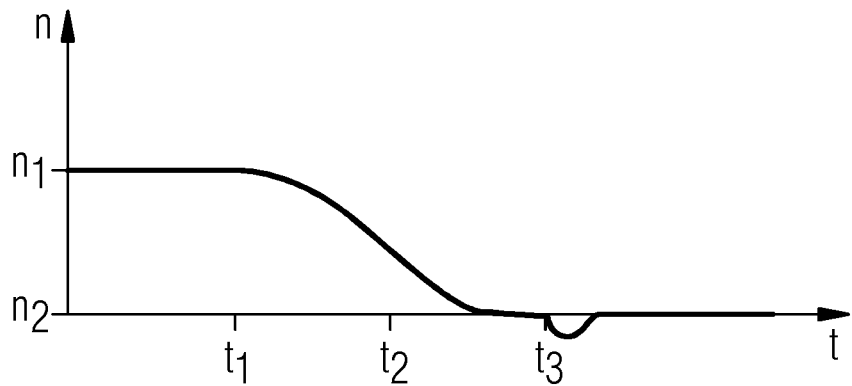
FIG. 2 shows a rotational speed characteristic of a drive drum during a stopping phase according to the related art.
Figure 3:
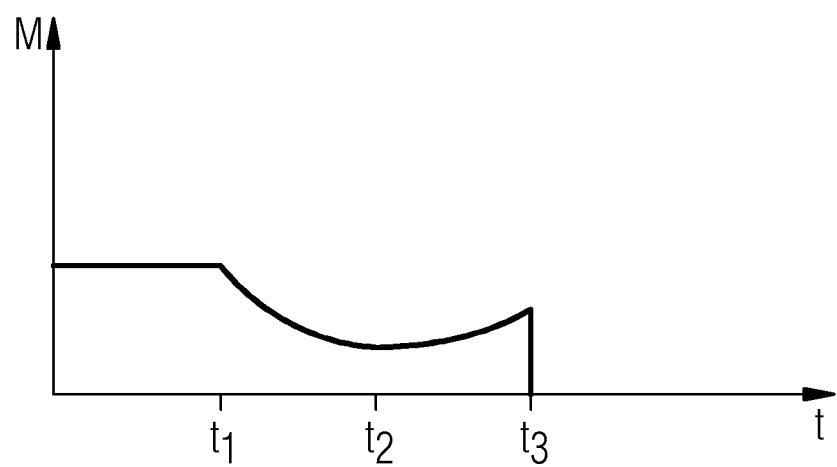
FIG. 3 shows the torque characteristic during the stopping phase illustrated in FIG. 2.

A characteristic, specified in this way, of the rotational speed of the drive drum 6 is illustrated in FIG. 2 by way of example for a stopping phase of the belt 4. The corresponding torque characteristic is shown in FIG. 3. Up until time $t_1$ the drive drum 6 rotates at a first rotational speed $n_1$. The belt 4 is in its operating state and is moved at the speed v.

To change the speed v of the belt 4, in this case to stop, the speed n of the drive drum 6 is reduced in accordance with a predefined, almost ramp-like rotational speed characteristic curve by the converter 14 and motor 12. In this case the second rotational speed $n_2$ is equal to zero. The rotational speed characteristic curve has ramp roundings at the start and end of the ramp respectively so no force impacts, which would have an adverse effect on the belt 4, are exerted thereon. Reducing the rotational speed n between the times $t_1$ and $t_2$ simultaneously reduces the torque M as well. However, once the time $t_2$ has been exceeded the torque M increases, and this leads to tensioning of the belt. After the belt 4 has come to a standstill and after the associated switching-off of the converter 14, the torque M is set to zero, although this means that the rotational speed n is given a brief negative momentum due to the tensioning energy stored in the belt 4. Such behavior of the belt can lead to rapid material wear, however.

According to the proposed method it is therefore not the rotational speed n of the drive drum 6 that is specified but the torque M acting on the drive drum 6 that is controlled and therefore specified.

FIG. 4 accordingly illustrates a torque characteristic curve during application of the method. The torque M acting on the drive drum 6 is controlled in order to alter the speed v of the belt 4, in this case to stop the belt 4 again, during a time window $\Delta t$ defined by a first rotational speed $n_1$ of the drive drum 6 and a second rotational speed $n_2$ of the drive drum 6. This control occurs by the controller 16 implemented in the frequency converter 14, so the motor 12 is driven in such a way that the specified torque M acts on the drive drum 6 and this in turn exerts a force on the belt 4. The controller 16 does not have to be implemented in the converter 14 and can instead also be located outside it.

A torque characteristic curve of this kind must accordingly be designed in such a way that particularly gentle deceleration of the belt 4 results so it does not become tensioned. On the one hand the duration of the time window $\Delta t$ plays a significant part. This is generally defined by the time $t_1$, at which the drive drum 6 has a first rotational speed $n_1$, and the time $t_2$, at which the drive drum has a second rotational speed, for example $n_2=0$. This time window $\Delta t$ must be chosen to be large enough for the torque M not to exhibit a jerky course either. In the example it is much longer than the coasting time of the conveyor installation, so the motors 12 gently brake the belt 4 and do not stop it with a jerk. On the other hand the shape of the torque characteristic curve is particularly important. In order to achieve tension-free deceleration of the belt 4 the torque M acting on the belt 4 by the drive drum 6 is controlled in such a way that it decreases monotonically. In the example the torque M runs linearly from an initial value through to zero. This reduction in the torque M causes a decrease in the rotational speed n from a first rotational speed $n_1$ to a second rotational speed $n_2=0$, as is illustrated in FIG. 5. Once the drive drum 6 has reached the second rotational speed $n_2$, in this case at a standstill of the belt 4 therefore, the belt is fixed by a fixing brake 18 so it is not accelerated again due to its own weight or loaded material.

According to the method therefore the speed v of the belt is altered explicitly by specification of a torque M and not, as shown above in the related art, by specification of a rotational speed. Tensioning of the belt 4 is avoided as a result. When the converter 14 is switched off, and this occurs after the end of time window Δt, i.e. when the second rotational speed $n_2=0$ is reached, the belt does not spring back therefore.

In conveyor installations it is possible to carry out this method on the basis of the speed-torque characteristic since the required torque M is at a very high level even at low rotational speeds n, low acceleration moments need to be applied in contrast to driving power, and at high speeds v the required torques M do not increase linearly with the speed v but are much lower.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating a conveyor installation comprising a belt and at least one drive drum driving the belt, the method comprising:
   controlling a torque acting on the at least one drive drum in order to alter the speed of the belt, the controlling being performed within a time window that is defined by a time required for the at least one drive drum to transition from a first rotational speed to a second rotational speed, wherein
   the torque continually increases or continually decreases within the time window, so as to avoid abrupt changes in the torque.

2. The method as claimed in claim 1, wherein the first rotational speed is lower than the second rotational speed and the torque is controlled within the time window such that the torque is monotonically increasing.

3. The method as claimed in claim 1, wherein the first rotational speed is greater than the second rotational speed and the torque is controlled within the time window such that the torque is monotonically decreasing.

4. The method as claimed in claim 1, wherein the second rotational speed is zero.

5. The method as claimed in claim 1, further compromising fixing the belt by a fixing brake after the at least one drive drum reaches the second rotational speed.

6. The method as claimed in claim 1, wherein the torque linearly increases or linearly decreases within the time window.

7. The method as claimed in claim 1, further comprising setting the time window to be at least twice as long as a coasting time of the conveyor installation.

8. A conveyor installation, comprising:
   a belt;
   at least one drive drum driving the belt; and
   a controller configured to control a torque acting on the at least drive drum in order to alter the speed of the belt, the controller controlling the torque within a time window that is defined by a time required for the at least one drive drum to transition from a first rotational speed to a second rotational speed, wherein the controller controls the torque to continually increase or continually decrease within the time window, so as to avoid abrupt changes in torque.

9. The conveyor installation as claimed in claim 8, wherein the first rotational speed is lower than the second rotational speed and the controller controls the torque within the time window such that the torque is monotonically increasing.

10. The conveyor installation as claimed in claim 8, wherein the first rotational speed is greater than the second rotational speed and the controller controls the torque within the time window such that the torque is monotonically decreasing.

11. The conveyor installation as claimed in claim 8, wherein the second rotational speed is zero.

12. The conveyor installation as claimed in claim 8, further comprising a fixing brake configured to fix the belt after the at least one drive drum reaches the second rotational speed.

13. The conveyor installation as claimed in claim 8, wherein the controller controls the torque to linearly increase or linearly decrease within the time window.

14. The conveyor installation as claimed in claim 8, wherein the time window is to be at least twice as long as a coasting time of the conveyor installation.

* * * * *